(12) United States Patent
Roessner et al.

(10) Patent No.: US 11,769,030 B2
(45) Date of Patent: Sep. 26, 2023

(54) ENROLMENT DEVICE FOR A BIOMETRIC SMART CARD

(71) Applicant: Advanide Holdings Pte. Ltd., Singapore (SG)

(72) Inventors: Holger Roessner, Singapore (SG); Angelo Roessner, Singapore (SG)

(73) Assignee: Advanide Holdings Pte. Ltd., Singapore (SG)

( * ) Notice: Subject to any disclaimer, the term of this patent is extended or adjusted under 35 U.S.C. 154(b) by 168 days.

(21) Appl. No.: 17/612,938

(22) PCT Filed: May 27, 2020

(86) PCT No.: PCT/IB2020/055016
§ 371 (c)(1),
(2) Date: Nov. 19, 2021

(87) PCT Pub. No.: WO2020/240430
PCT Pub. Date: Dec. 3, 2020

(65) Prior Publication Data
US 2022/0230037 A1    Jul. 21, 2022

(30) Foreign Application Priority Data

May 31, 2019 (GB) ..................................... 1907707

(51) Int. Cl.
*G06K 19/07* (2006.01)
*G06K 19/073* (2006.01)
(52) U.S. Cl.
CPC ............................. *G06K 19/07354* (2013.01)
(58) Field of Classification Search
CPC ............................................... G06K 19/07354
(Continued)

(56) References Cited

U.S. PATENT DOCUMENTS

| 2008/0223925 A1 | 9/2008 | Saito et al. |
| 2010/0320274 A1 | 12/2010 | Nielsen et al. |

(Continued)

FOREIGN PATENT DOCUMENTS

| JP | 2004298465 | 10/2004 |
| KR | 1020160125877 | 11/2016 |

(Continued)

OTHER PUBLICATIONS

Roessner, Holger; International Preliminary Report on Patentability for PCT/IB2020/055016, filed May 27, 2020, dated Nov. 16, 2021, 6 pgs.

(Continued)

*Primary Examiner* — Daniel A Hess
(74) *Attorney, Agent, or Firm* — Taylor English Duma LLP

(57) ABSTRACT

The application provides an enrolment card for a biometric card with a first card body. The enrolment card includes a battery for providing electrical power, a microcontroller unit that is electrically connected to the battery, and a plurality of contact pins that are electrically connected to the battery and to the microcontroller unit. The enrolment card further includes a second card body with a card engagement element. The second card body is sized to correspond to the first card body. The battery and the second microcontroller unit are embedded in the second card body. The enrolment card provides an enrolment mode, wherein the card engagement element engages with the first card body for allowing the contact pins to contact corresponding contact pads of the biometric card and the battery provides the electrical power to the biometric card.

33 Claims, 12 Drawing Sheets

Figure 1:
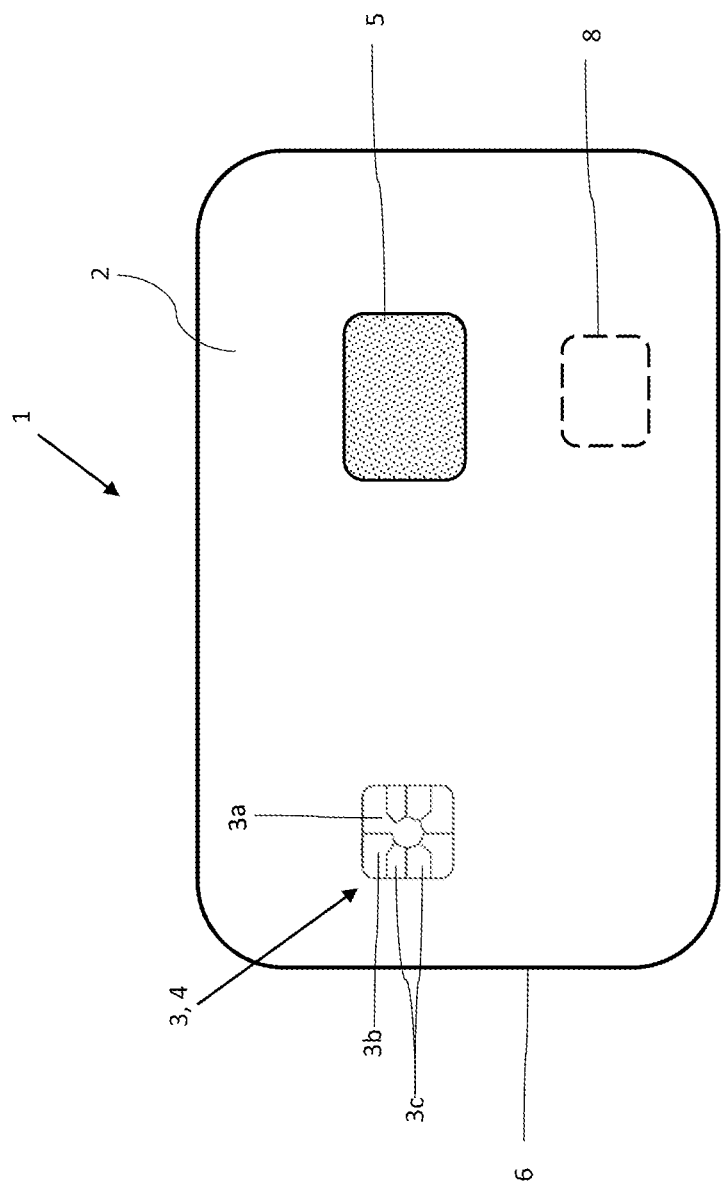

(58) Field of Classification Search
USPC .......................................................... 235/492
See application file for complete search history.

(56) References Cited

U.S. PATENT DOCUMENTS

| | | |
|---|---|---|
| 2018/0276519 A1 | 9/2018 | Benkley, III et al. |
| 2018/0373857 A1 | 12/2018 | Larsen |

FOREIGN PATENT DOCUMENTS

| | | |
|---|---|---|
| KR | 1020180041014 | 4/2018 |
| KR | 1020180130031 | 12/2018 |

OTHER PUBLICATIONS

Roessner, Holger; International Search Report and Written Opinion for PCT/IB2020/055016, filed May 27, 2020, dated Sep. 16, 2020, 8 pgs.

Advanide Holdings Pte. Ltd.; Extended European Search Report for application No. 20812665.6, dated May 23, 2023, 14 pgs.

ENROLMENT DEVICE FOR A BIOMETRIC SMART CARD

This application relates to an electronic device for transferring enrolment data to a biometric smart card.

The biometric smart card contains an integrated circuit device. The biometric smart card resembles a credit card in size and shape. The biometric smart card is widely used in many application areas. Standardized biometric smart cards, such as those with surface contacts that conform to ISO/IEC 7816 may be used with smart card reading/writing devices for performing payment transaction, as an example.

For improved security, a reference biometric template of an owner, such as a right or left thumb fingerprint, is stored in a secure memory of a biometric smart card of the owner. In an enrolment phase, an electronic device is used to sense and obtain fingerprint information of a finger of the card owner and to transfer the fingerprint information to the biometric smart card for storing as a reference biometric template. To make a payment with the biometric smart card, an electronic terminal or device captures fingerprint information of the card user and later compares it with the reference biometric template of the biometric smart card. A successful payment transaction can be done only when the captured fingerprint information essentially matches with the reference biometric template of the biometric smart card.

The biometric smart card can also be used to control access to access-controlled areas, such as rooms or premises of hotels, corporate and government buildings. It can also be used to determine whether a person is eligible for a ticket concession, or for obtaining a service based on the biometric identity of the person.

GB2556625 discloses a method of enrolling of a user onto a biometric device, such as a smartcard. The method comprises a step of reading a fingerprint of the user using a fingerprint sensor of an enrolment processing unit, followed by a step of extracting biometric data corresponding to the fingerprint, wherein the extraction is performed in a secure processing environment of the enrolment processing unit. The method further includes a step of converting the biometric data to secure biometric data within the secure processing environment, and a step of transmitting the secure biometric data from the enrolment processing unit to the smartcard. The processing unit is also configured to supply power to the smartcard.

It is an object of this application to provide an enrolment device for providing a biometric smart card with a biometric template.

The application provides a biometric enrolment setup or arrangement. The biometric enrolment setup includes a biometric card and an enrolment card.

The biometric card refers to a smart card, which is configured to store a reference fingerprint biometric template. The reference fingerprint biometric template often contains a digital representation of the biometric information of a user's finger, wherein the digital representation is often secured such that it cannot be easily duplicated. The reference biometric template is used to authenticate or determine an identity of a person in order to allow the person to access systems, devices, or data.

The enrolment card is used for enabling the biometric card to generate a reference biometric template from a fingerprint of a user and to store the generated reference biometric template.

In detail, the biometric card includes a plurality of contact pads, a fingerprint sensor, a first microcontroller unit, and a first card body. The first microcontroller unit is also called card microcontroller unit.

The contact pads can conform to ISO standard 7816 and they can have six or eight electrically conductive pads.

The first microcontroller unit is electrically connected to the contact pads and to the fingerprint sensor.

The first card body often comprises a thin flat piece of plastic. Both the fingerprint sensor and the first microcontroller unit are embedded in the first card body while the contact pads are provided at predetermined positions on a surface of the first card body.

Referring to the enrolment card, it includes a battery, a second microcontroller unit, a plurality of contact pins, and a second card body with a card engagement element. The second microcontroller unit is also called enrolment microcontroller unit.

The battery is often portable, and the second microcontroller unit is electrically connected to the battery. The contact pins are electrically connected to the battery and to the second microcontroller unit. The contact pins are positioned for contacting the corresponding contact pads of the biometric card.

The second card body also often comprises a thin flat piece of plastic, which is sized to correspond to the first card body of the biometric card. The second card body and the first card body often have essentially the same dimensions. Both the battery and the second microcontroller unit are embedded in the second card body such that the second card body encloses the battery and the second microcontroller unit. In other words, an external surface of the second card body surrounds the battery the second microcontroller unit.

The biometric enrolment setup provides an enrolment mode for generating a reference biometric template and for storing it in a memory of the first microcontroller unit of the biometric card.

In the enrolment mode, the battery is intended for storing electrical power.

A user then places the biometric card next to the enrolment card such that the card engagement element of the second card body of the enrolment card engages with the first card body of the biometric card. This engagement also allows a user to align the second card body with the first card body for allowing the contact pins of the enrolment card to contact the corresponding contact pads of the biometric card.

The battery of the enrolment card then provides electrical power to the contact pins, to the contact pads, and to the first microcontroller unit of the biometric card for energising the first microcontroller unit.

The second microcontroller unit later sends an enrolment command to the first microcontroller unit to commence an enrolment process.

The user afterward places a finger of the user on the fingerprint sensor, wherein the fingerprint sensor senses and obtains fingerprint biometric information of the finger for transferring to the first microcontroller unit.

The first microcontroller unit later generates a reference fingerprint biometric template according to the obtained fingerprint biometric information and then stores the generated reference fingerprint biometric template in the memory of the first microcontroller unit.

The biometric enrolment setup also provides an operation mode.

In the operation mode, the contact pads are intended for contacting with a part of an electronic device, such as a credit card reader.

A user later places a finger of the user on the fingerprint sensor. The fingerprint sensor then obtains fingerprint biometric information of the finger.

The first microcontroller unit afterward compares this obtained fingerprint biometric information with the above-mentioned reference fingerprint biometric template to authenticate an identity of the user for determining whether the user is allowed or is eligible, for example, to use a credit card for payment.

The card engagement element of the enrolment card allows quick and easy alignment between the enrolment card and the biometric card, thereby enabling the user to perform self-enrolment of the biometric card easily and efficiently Such biometric card and the enrolment card can be produced at low cost because both can be produced using the same equipment and same plastic material and with essentially the same dimensions. This also allows easy delivery of these cards to a user, using common methods such as mailing.

The second card body of the enrolment card can include an inlay. The inlay comprises a stack of plastic sheets and several components. The components refer to the second microcontroller unit, the battery, and a plurality of electrical connecting means. The electrical connecting means include electrical wires. One or more holes can be provided within the stack of the plastic sheets for receiving the battery and/or the second microcontroller unit. The battery is electrically connected to the second microcontroller unit via the electrical connecting means.

The card engagement element can include a fingerprint opening.

In use, the fingerprint opening of the enrolment card is aligned with the fingerprint sensor of the biometric card such that the fingerprint opening can receive a finger of a user to contact with the fingerprint sensor.

Furthermore, the fingerprint opening also serves orienting the enrolment card with the respect to the biometric card such that the biometric card is aligned with the enrolment card and such that the contact pins of the enrolment card are aligned to contact the corresponding contact pads of the biometric card. In short, this enables the contact pins to contact the contact pads.

The card engagement element can further include a card fixing friction opening for fixing the contact pins to the corresponding contact pads. In use, the card fixing friction opening of the enrolment card receives a finger of a user. The finger presses the card fixing friction opening onto the biometric card. The pressing fixes the finger to the biometric card, and it fixes the enrolment card onto the biometric card, thereby preventing the biometric card from moving or shifting with respect to the enrolment card. This fixing also prevents the contact pins of the enrolment card from moving away from the corresponding contact pads of the biometric card. In effect, this enables the contact pins to maintain a firm contact with the contact pads.

In one implementation, the second card body of the enrolment card is provided with a rectangular shape. The first card body of the biometric card is also sized to have essentially the same rectangular shape.

The card engagement element can include one or more card reception openings that are provided on an edge portion of the second rectangular card body. The card reception openings are configured to engage with an edge part of the first rectangular card body such that the first rectangular card body is positioned with respect to the second rectangular card body to allow the contact pins to contact the corresponding contact pads.

The edge portion can be provided near a short edge of the second rectangular card body. The contact pins contact the corresponding contact pads when the card reception openings engage with the first rectangular card body of the biometric card and edges of the second rectangular card body are aligned with corresponding edges of the first rectangular card body along straight lines.

Alternatively, the edge portion can be provided near a long edge of the second rectangular card body, wherein the long edge is essentially perpendicular to the short edge. The card engagement element can further include one or more alignment lines for positioning the first rectangular card body with respect to the second rectangular card body such that the contact pins contact the corresponding contact pads.

The enrolment card can further include a low power means for configuring the second microcontroller unit into a low power mode, wherein the second microcontroller unit temporarily stops operating. This is for saving energy and for extending an operating life of the battery. The low power means can later be disabled for activating the second microcontroller unit.

In one implementation, the low power means comprises a wire that electrically connects a low power terminal of the second microcontroller unit to an electrical ground. The wire is later cut for activating the second microcontroller unit. The cut wire does not electrically connect the low power terminal to the electrical ground.

The application also provides an enrolment card for a biometric card with a first card body.

The enrolment card includes a battery for providing electrical power and an enrolment microcontroller unit that is electrically connected to the battery. The enrolment card further includes a plurality of contact pins, which are electrically connected to the battery and to the enrolment microcontroller unit. The enrolment card also includes a second card body with a card engagement element. The second card body, which is often a thin flat piece of plastic, is sized to correspond to the first card body. Both the battery and the enrolment microcontroller unit are embedded in the second card body such that the second card body encloses both the battery and the enrolment microcontroller unit.

The enrolment card provides an enrolment mode. In the enrolment mode, the card engagement element engages with the first card body of the biometric card for allowing the contact pins to contact corresponding contact pads of the biometric card.

The battery then provides the electrical power to the enrolment microcontroller unit, and to a card microcontroller unit of the biometric card.

The second card body of the enrolment card can include an inlay. The inlay comprises a stack of plastic sheets. At least one hole can be provided within the stack of plastic sheets for receiving the battery and/or the enrolment microcontroller unit.

The card engagement element can include a fingerprint opening for allowing a finger of a user to contact the fingerprint sensor and for allowing the user to align the biometric card with the enrolment card such that the contact pads contact the corresponding contact pins.

The card engagement element can further include a card fixing friction opening for preventing the contact pins from moving with respect to the corresponding contact pads.

In one implementation, the second card body is provided with a rectangular shape. The first card body is also sized to have essentially the same rectangular shape.

The card engagement element can include one or more card reception openings that are provided on an edge portion of the second rectangular card body.

The edge portion can be provided near a short edge of the second rectangular card body.

Alternatively, the edge portion can be provided near a long edge of the second rectangular card body, wherein the long edge is essentially perpendicular to the short edge. The card engagement element can further include one or more alignment lines for positioning the first rectangular card body with respect to the second rectangular card body such that the contact pins contact the corresponding contact pads.

The enrolment card can further include a low power means for configuring the enrolment microcontroller unit into a low power mode. In one implementation, the low power means comprises a wire that connects a low power terminal of the enrolment microcontroller unit to an electrical ground.

The application also provides a biometric card. The biometric card includes a plurality of contact pads that conform to ISO standard 7816, a fingerprint sensor, and a card microcontroller unit that is electrically connected to the contact pads and to the fingerprint sensor. The biometric card further includes a card body which is often a thin flat piece of plastic in a rectangular shape. Both the fingerprint sensor and the card microcontroller unit are embedded in the card body. The contact pads are configured to receive electrical power from a battery of an enrolment card while the fingerprint sensor is configured to obtain fingerprint biometric information of a user for transferring to the card microcontroller unit. The card microcontroller unit is configured to generate a fingerprint reference biometric template according to the obtained fingerprint biometric information and to store the fingerprint reference biometric template in a memory of the card microcontroller unit.

The application further provides a method for enrolment of a biometric card using an enrolment card. The method includes a step of engaging a card engagement element of the enrolment card with the biometric card for allowing contact pins of the enrolment card to contact corresponding contact pads of the biometric card. The method further includes a step of providing electrical power by a battery of the enrolment card to a card microcontroller unit of the biometric card, followed by a step of obtaining fingerprint biometric information of a user by a fingerprint sensor of the biometric card. The card microcontroller unit of the biometric card later generates a reference fingerprint biometric template according to the obtained fingerprint biometric information. The card microcontroller unit afterward stores the generated reference fingerprint biometric template in a memory of the card microcontroller unit of the biometric card.

The application also provides another biometric enrolment setup. The biometric enrolment setup includes a biometric card and an enrolment card for transferring fingerprint biometric information of a user to the biometric card. The biometric card comprises a first antenna, a fingerprint sensor, and a first microcontroller unit. The first microcontroller unit is electrically connected to the first antenna and to the fingerprint sensor. The biometric card further includes a first card body. The fingerprint sensor, the first microcontroller unit, and the first antenna are embedded in the first card body. The enrolment card comprises a battery for providing electrical power and a second microcontroller unit that is electrically connected to the battery. The enrolment card further comprises a second antenna that is electrically connected to the second microcontroller unit, and a second card body. The battery, the second microcontroller unit, and the second antenna are embedded in the second card body such that the second card body encloses the battery, the second microcontroller unit, and the second antenna.

The biometric enrolment setup provides an enrolment mode. In the enrolment mode, the biometric card is positioned near the enrolment card. The second microcontroller unit later receives electrical power from the battery. The second microcontroller unit then powers the second antenna for communicatively connecting the second antenna with the first antenna. The second antenna afterward transmits the electrical power to the first antenna, and to the first microcontroller unit. The fingerprint sensor afterward obtains fingerprint biometric information of a user for transferring to the first microcontroller unit. The first microcontroller unit then generates a reference fingerprint biometric template according to the obtained fingerprint biometric information and stores the reference fingerprint biometric template in a memory of the first microcontroller unit.

The second card body of the enrolment card can include an inlay. The inlay comprises a stack of plastic sheets. At least one hole can be provided within the stack of plastic sheets for receiving the battery and/or the second microcontroller unit.

The enrolment card can include a low power means for configuring the second microcontroller unit into a low power mode. In one implementation, the low power means comprises a wire that connects a low power terminal of the second microcontroller unit to an electrical ground.

The application further provides another enrolment card for a biometric card that is provided with a first antenna. The enrolment card includes a battery for providing electrical power and an enrolment microcontroller unit that is electrically connected to the battery. The enrolment card further includes a second antenna that is electrically connected to the enrolment microcontroller unit, and a card body. The battery, the enrolment microcontroller unit, and the second antenna are embedded in the card body such that the card body encloses the battery, the enrolment microcontroller unit, and the second antenna. The enrolment card provides an enrolment mode. In the enrolment mode, the enrolment card is positioned near the biometric card. The enrolment microcontroller unit later receives the electrical power from the battery. The second microcontroller unit then powers the second antenna to communicatively connect with the first antenna. The second antenna afterward transmits the electrical power to the first antenna and to a card microcontroller unit of the biometric card.

The card body of the enrolment card can include an inlay. The inlay comprises a stack of plastic sheets. At least one hole can be provided within the stack of plastic sheets for receiving the battery and/or the enrolment microcontroller unit.

The enrolment card can include a low power means for configuring the enrolment microcontroller unit into a low power mode. In one implementation, the low power means comprises a wire that connects a low power terminal of the enrolment microcontroller unit to an electrical ground.

The application also provides another biometric card. The biometric card includes an antenna, a fingerprint sensor, and a card microcontroller unit. The card microcontroller unit is electrically connected to the antenna and to the fingerprint sensor. The biometric card further includes a card body, wherein the fingerprint sensor, the card microcontroller unit, and the antenna are embedded in the card body such that the card body encloses the fingerprint sensor, the card microcontroller unit, and the antenna. The antenna is configured to receive electrical power from a battery of an enrolment card while the fingerprint sensor is configured to obtain fingerprint biometric information of a user. The card microcontroller unit is configured to generate a reference fingerprint biometric template according to the obtained fingerprint biometric information and to store the reference fingerprint biometric template in a memory of the card microcontroller unit.

Figure 2:
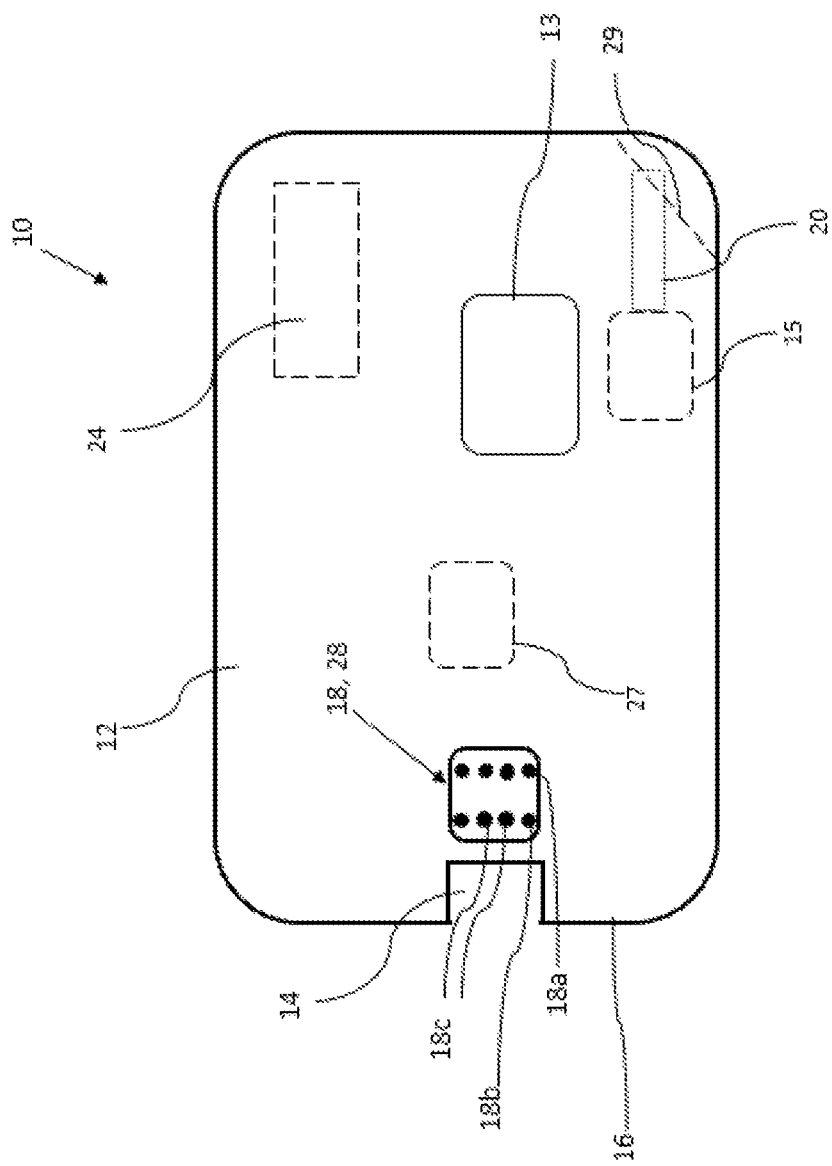
Figure 3:
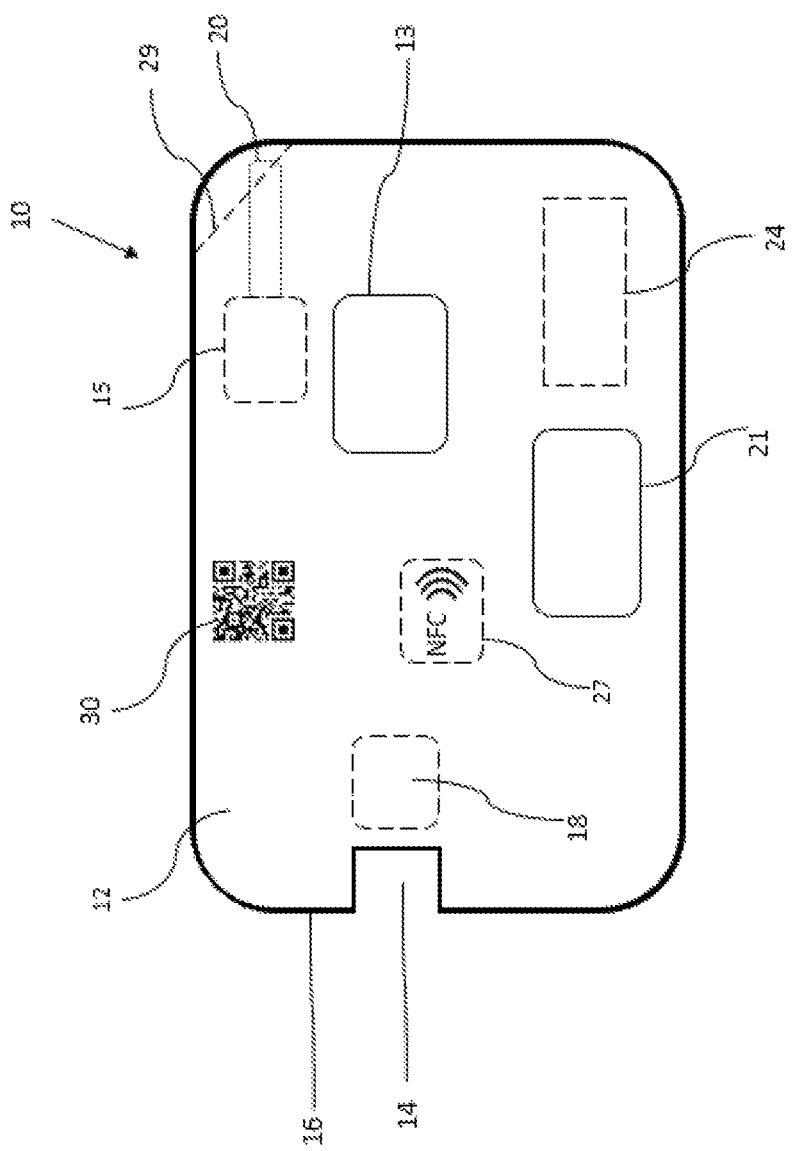
Figure 4:
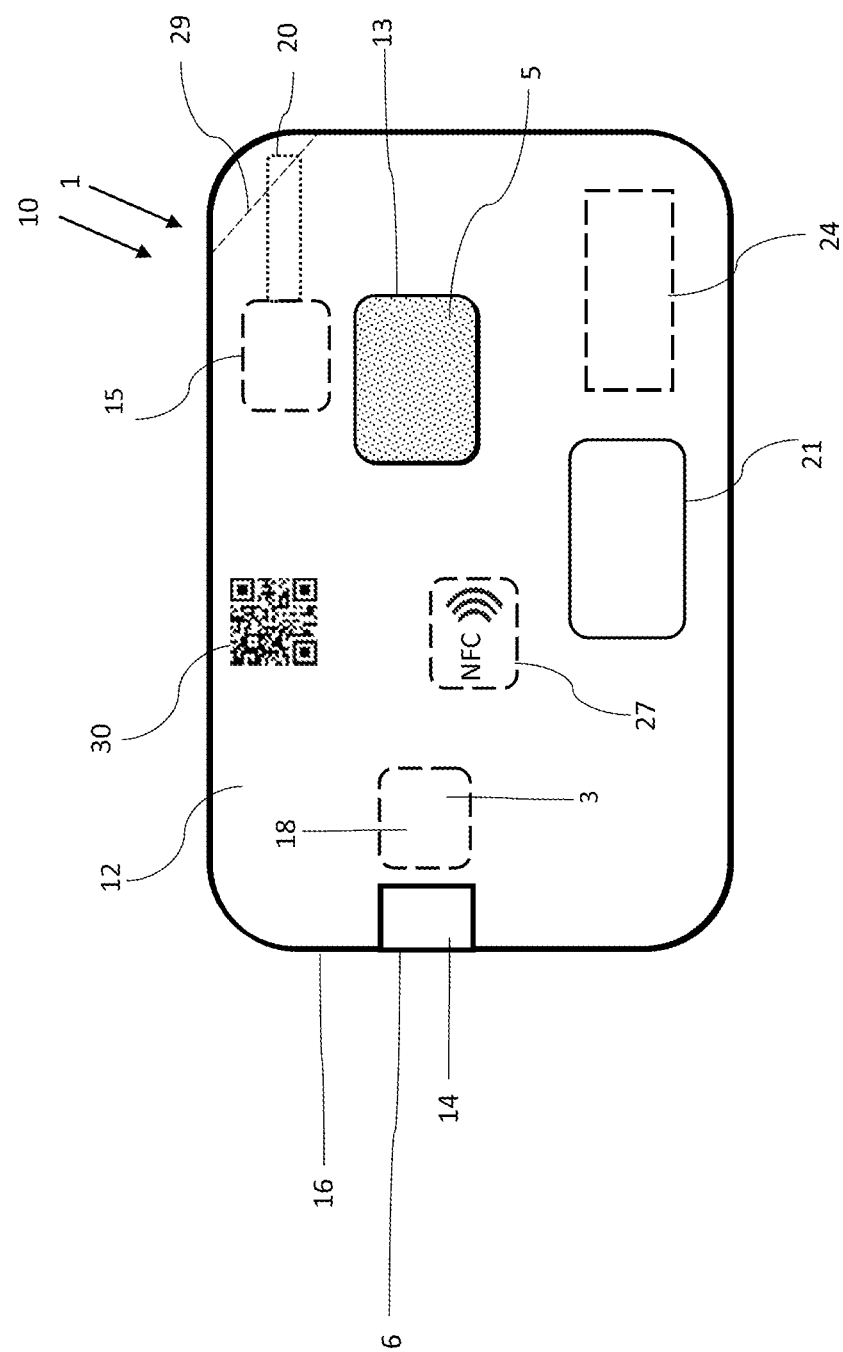
Figure 5:
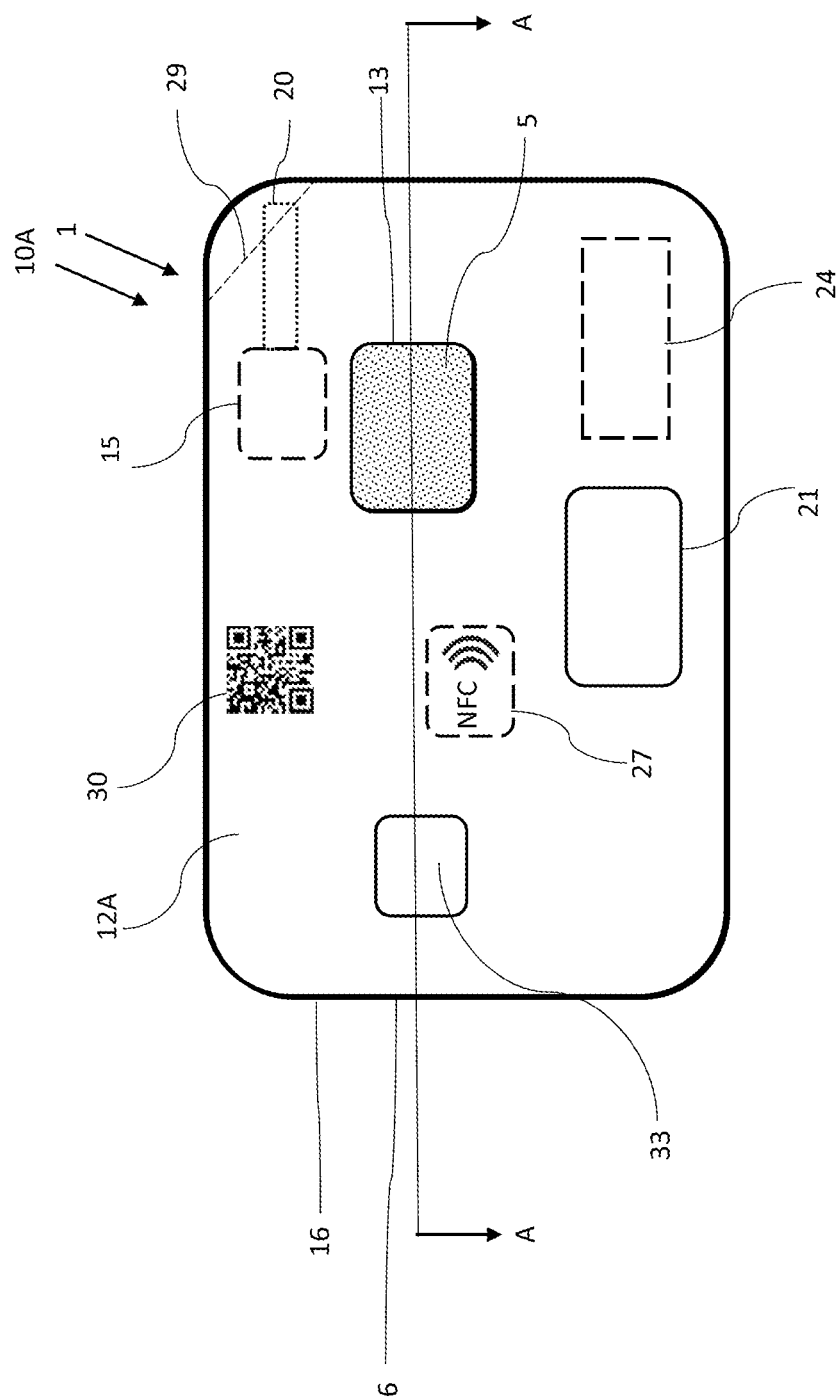
Figure 6:
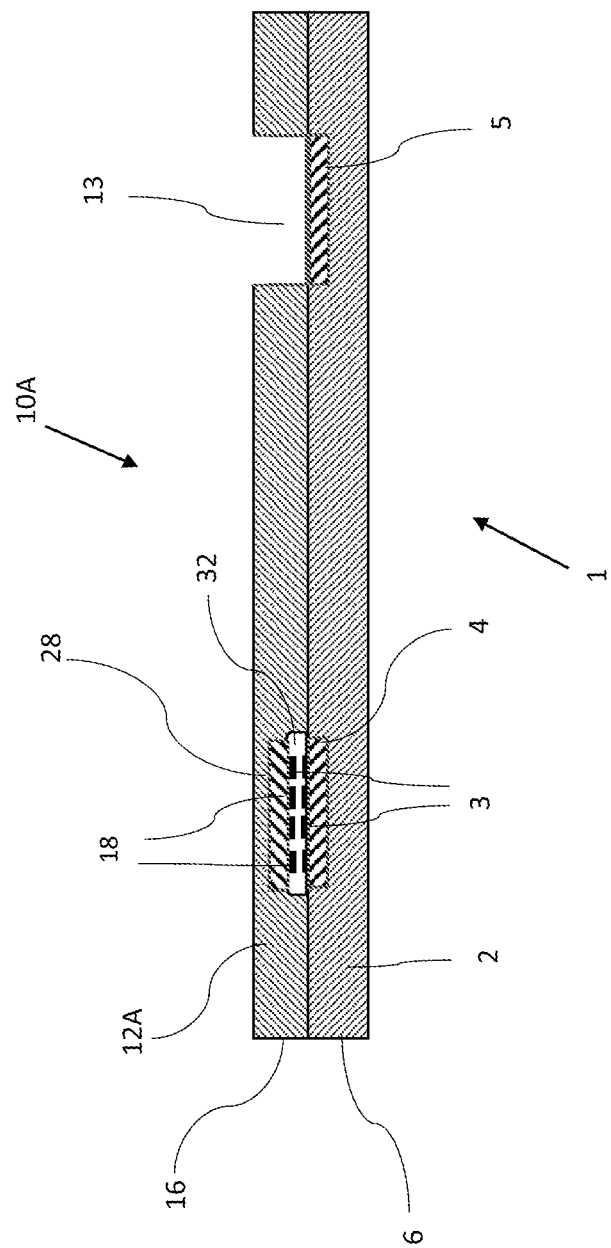
Figure 7:
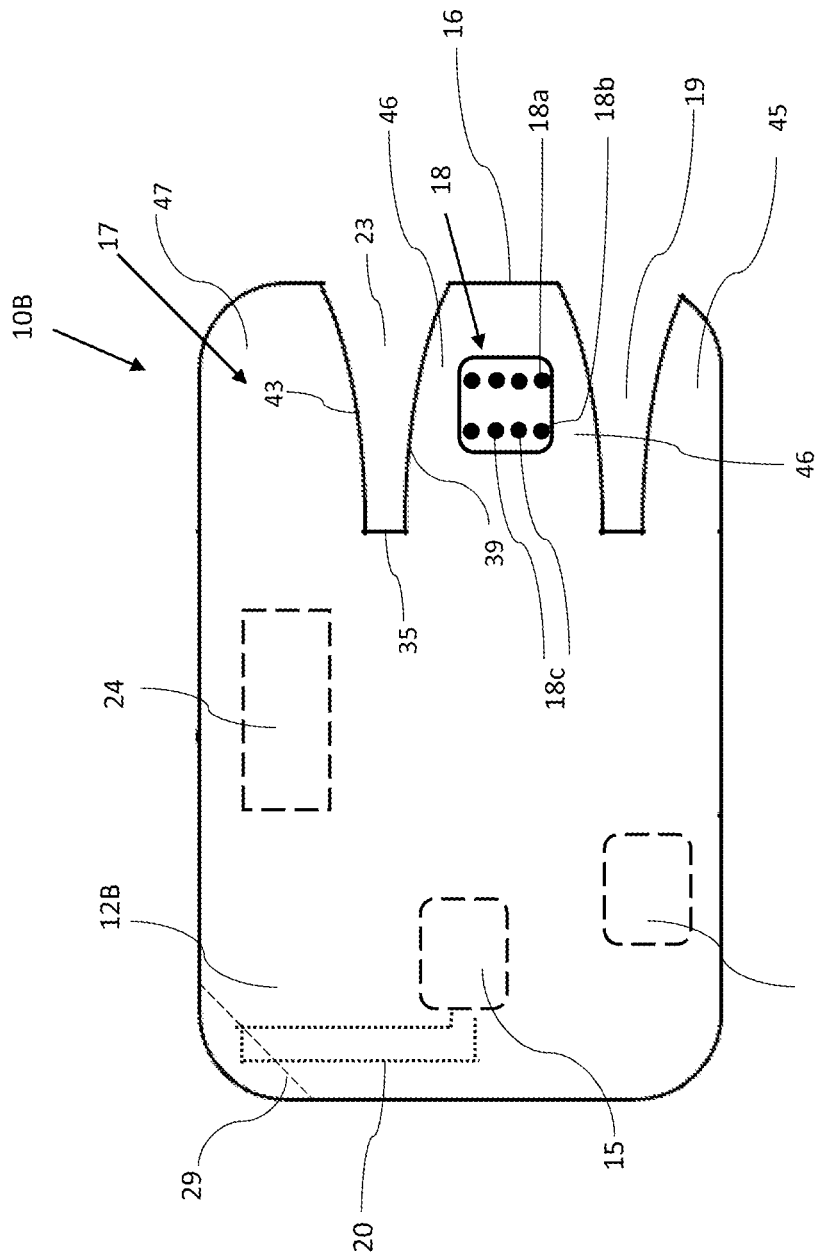
Figure 8:
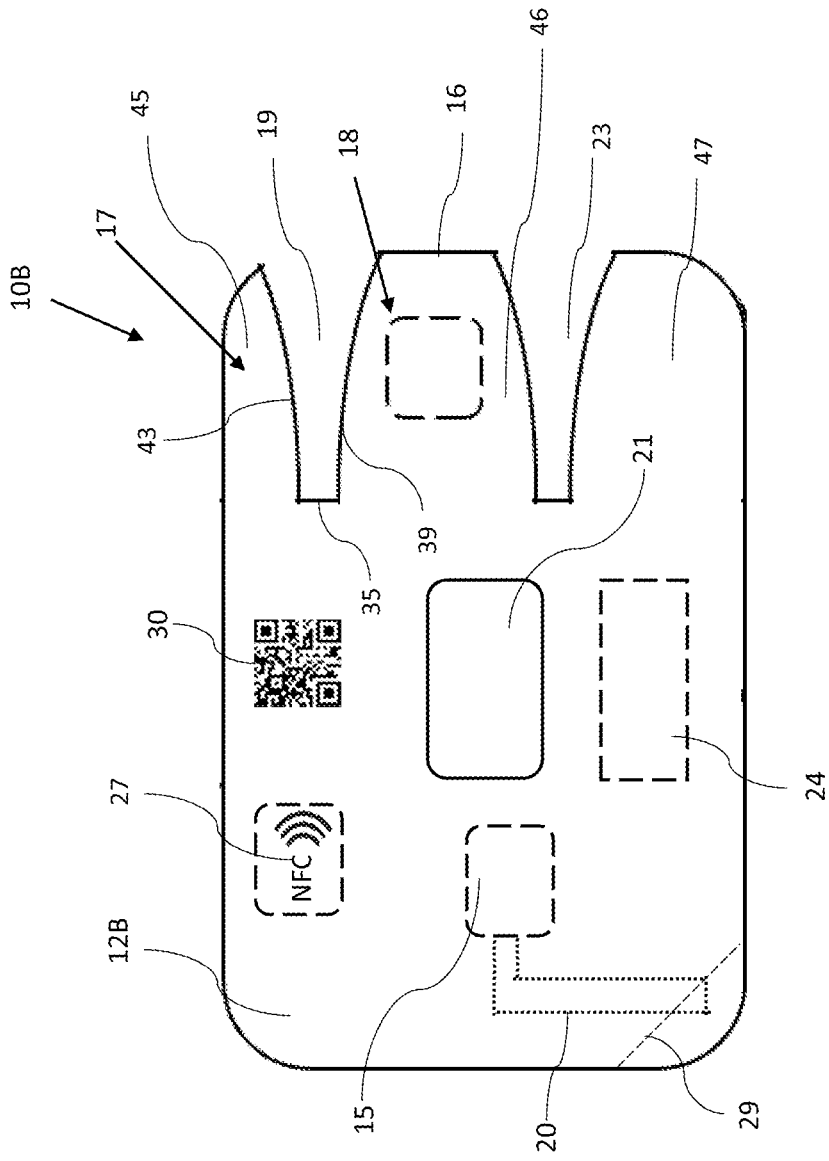
Figure 9:
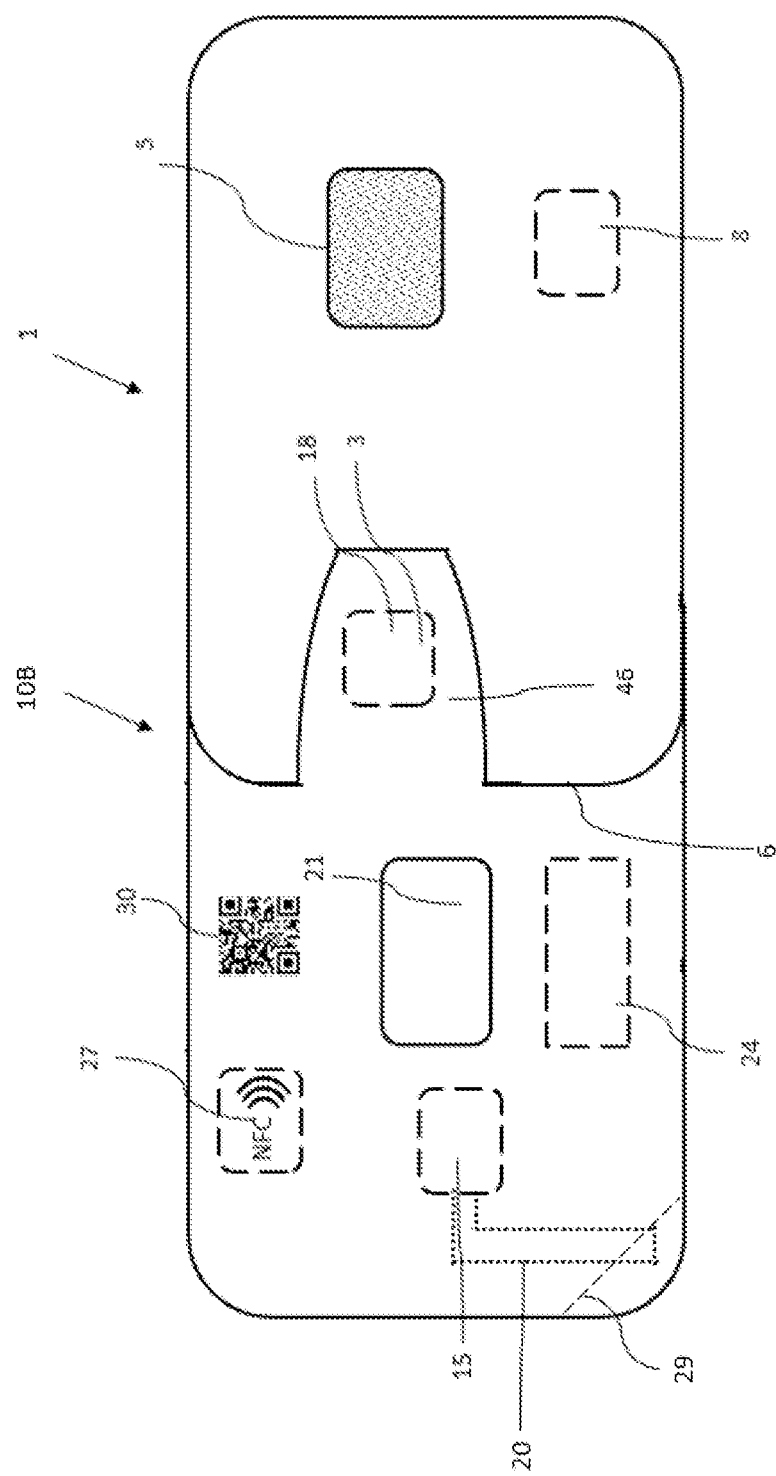
Figure 10:
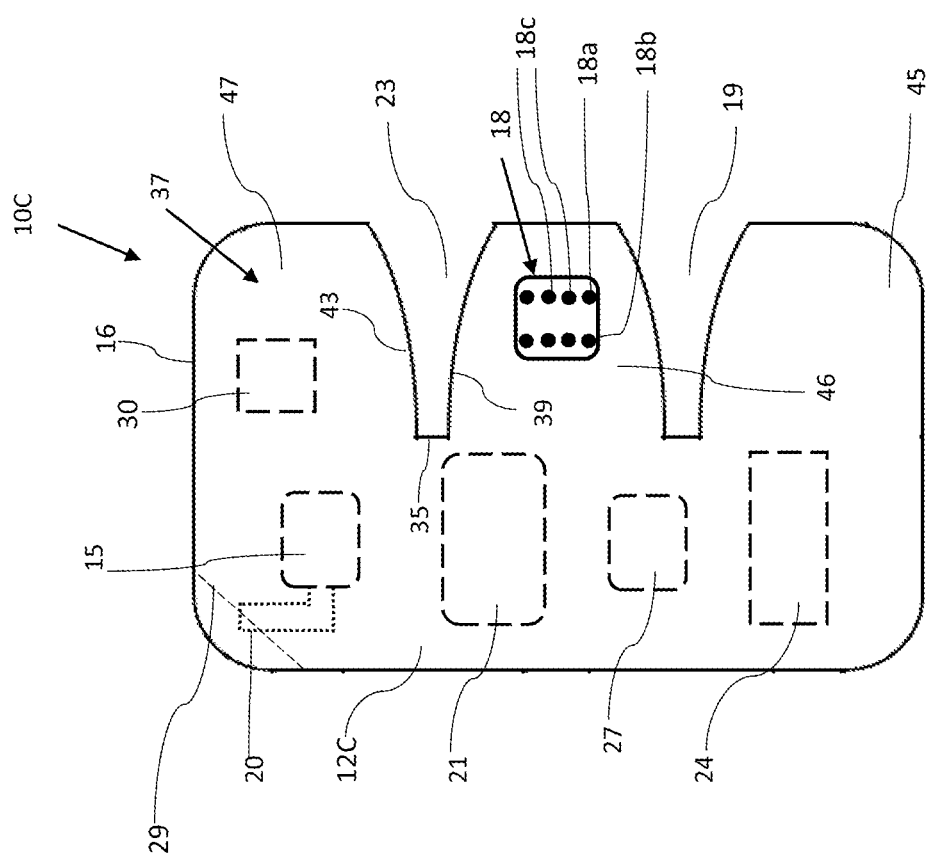
Figure 11:
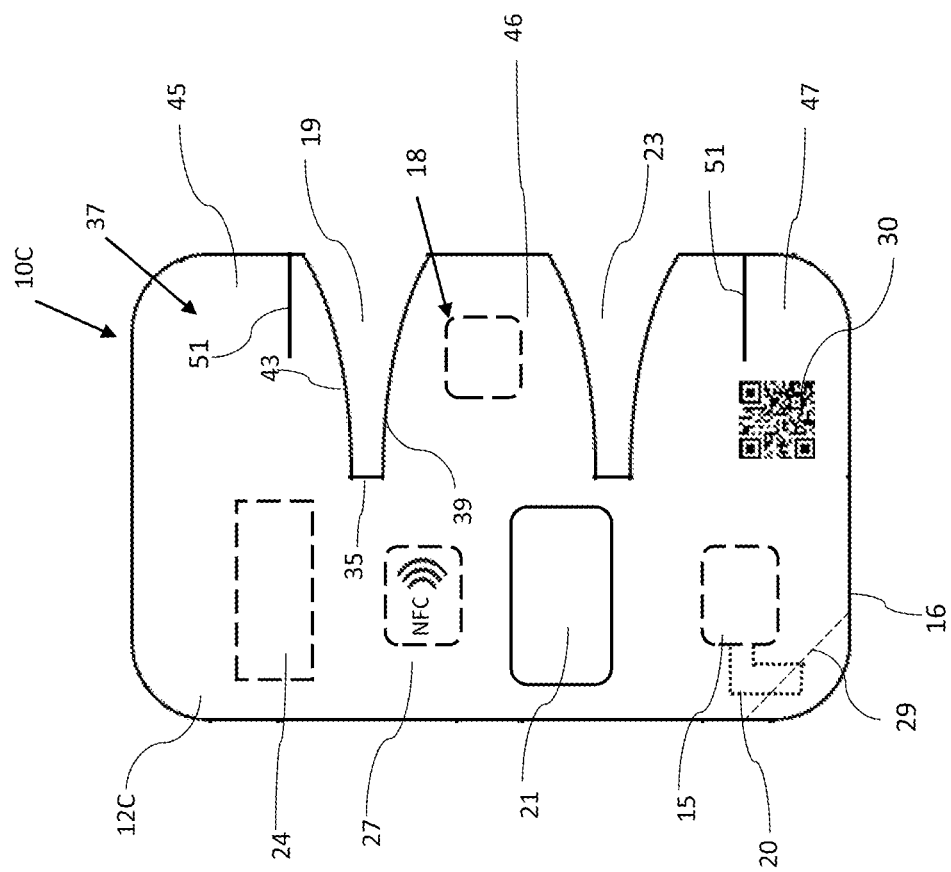
Figure 12:
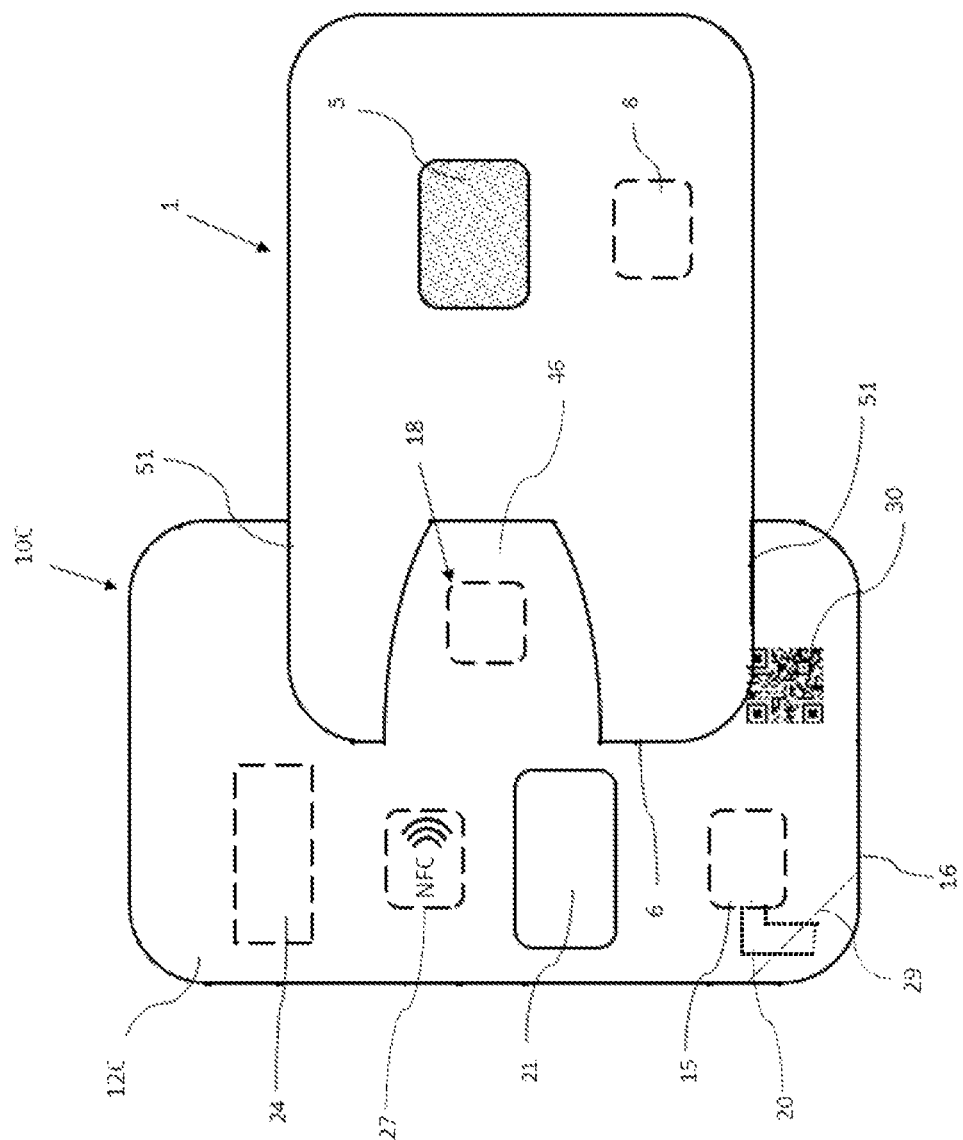

FIG. 1 illustrates a front surface of a biometric smart card,

FIG. 2 illustrates a rear surface of an enrolment card for the biometric smart card of FIG. 1, FIG. 3 illustrates a front surface the enrolment card of FIG. 2, FIG. 4 illustrates an engagement of the biometric smart card of FIG. 1 with the enrolment card of FIG. 2, wherein the rear surface of the enrolment card is placed on top or next to the front surface of the biometric smart card of FIG. 1, FIG. 5 illustrates an engagement of the biometric smart card of FIG. 1 with another enrolment card, which is a variant of the enrolment card of FIG. 2, FIG. 6 illustrates a cross-sectional view of the enrolment card of FIG. 5 being engaged with the biometric smart card of FIG. 1, taken along line AA of FIG. 5, FIG. 7 illustrates a rear surface of another enrolment card, which is a variant of the enrolment card of FIG. 2, FIG. 8 illustrates a front surface of the enrolment card of FIG. 7, FIG. 9 illustrates an engagement of the biometric smart card of FIG. 1 with the enrolment card of FIG. 7, wherein a part of the biometric smart card of FIG. 1 is inserted into cut-out portions of the enrolment card of FIG. 7, FIG. 10 illustrates a rear surface of a further enrolment card, which is a variant of the enrolment card of FIG. 2, FIG. 11 illustrates a front surface of the enrolment card of FIG. 10, and FIG. 12 illustrates an engagement of the biometric smart card of FIG. 1 with the enrolment card of FIG. 10, wherein a part of the biometric smart card of FIG. 1 is inserted into cut-out portions of the enrolment card of FIG. 10.

In the following description, details are provided to describe embodiments of the application. It shall be apparent to one skilled in the art, however, that the embodiments may be practiced without such details.

Some parts of the embodiments have similar parts. The similar parts may have the same names or the similar part numbers with an alphabet symbol. The description of one similar part also applies by reference to another similar part, where appropriate, thereby reducing repetition of text without limiting the disclosure.

FIG. 1 shows a biometric smart card 1 for receiving a reference biometric data from an enrolment card 10 of FIGS. 2 and 3.

The biometric smart card 1 includes a rectangular card body 2, a contact pad module 4, a fingerprint sensor 5, and a card microcontroller unit 8. The contact pad module 4, the fingerprint sensor 5, and the card microcontroller unit 8 are embedded within the card body 2. An external face of the contact pad module 4 and an external surface of the fingerprint sensor 5 are aligned with a front surface of the card body 2. The card microcontroller unit 8 is electrically connected to the contact pad module 4 and to the fingerprint sensor 5.

The card body 2 has a shape of a rectangular credit card. The credit card has two short edges that are parallel to each other and two long edges that are parallel to each other.

The contact pad module 4 includes a plurality of contact pads 3, which are provided on the external face of the contact pad module 4 near a short edge 6 of the card body 2. The contact pads 3 include an electrical ground (GND) contact pad 3a, a power supply (VCC) contact pad 3b, and multiple general-purpose input/output (GPIO) contact pads 3c. The contact pads 3a, 3b and 3c are respectively sized and positioned on predetermined positions of the front surface of the card body 2 according to the ISO standard 7816. The number of contact pads 3 can be six or can be eight.

The fingerprint sensor 5 includes a plurality of sensing elements that are provided on the external surface of the fingerprint sensor 5. The sensing elements are configured to contact a finger, to sense, and to obtain a fingerprint data of the finger. The fingerprint sensor 5 is located near another short edge that is opposite the short edge 6.

The card microcontroller unit 8 includes a microprocessor with a memory module. The microprocessor includes an electrical ground terminal that is electrically connected to the first GND contact pad 3a and a power supply voltage terminal that is electrically connected to the VCC contact pad 3b for receiving an electrical supply voltage from the VCC contact pad 3b. The card microcontroller unit 8 also includes few signal terminals, which are electrically connected to the first GPIO contact pads 3c for receiving signals from and for transmitting signals to a card reader. The memory module is configured to store a fingerprint matching algorithm. The microprocessor is configured to execute instructions of the fingerprint matching algorithm.

As seen in FIGS. 2 and 3, the enrolment card 10 includes a rectangular card body 12, a contact pin module 28, an enrolment microcontroller unit 15, a battery 24, a display unit 21, a near field communication (NFC) tag 27, and a quick response (QR) code 30. The contact pin module 28, the enrolment microcontroller unit 15, the battery 24, the display unit 21, and the NFC tag 27 are embedded within the card body 12. An external face of the contact pin module 28 is aligned with a rear surface of the card body 12 while an external face of the display unit 21 and the QR code 30 are aligned with a front surface of the card body 12. The battery 24 is electrically connected to the enrolment microcontroller unit 15 and to the display 21. The enrolment microcontroller unit 15 is also electrically connected to the display 21, to the contact pin module 28, and to the NFC tag 27.

The card body 12 has an essentially rectangular shape and a size that are similar to the card body 2 of the biometric smart card 1. The card body 12 includes a short edge 16, a fingerprint opening 13, and a card fixing friction cut-out 14. The cut-out 14 is located at or next to the short edge 16 while the fingerprint opening 13 is located near another short edge that is opposite the short edge 16.

The fingerprint opening 13 has a shape and a size that corresponds to a shape and a size of the fingerprint sensor 5 of the biometric smart card 1. As better seen in FIG. 4, the fingerprint opening 13 is positioned at a predetermined location of the card body 12, which corresponds to the location of the fingerprint sensor 5 of the biometric smart card 1.

The card fixing friction cut-out 14 is sized according to a size of a fingerprint of a finger.

The contact pin module 28 includes a plurality of contact pins 18, which may be provided in the form of solder balls or any other way. The solder balls refer to balls of solder that can protrude from the rear surface of the card body 12 for contacting with the contact pad 3. The contact pins 8 include a GND contact pin 18a, a VCC contact pin 18b, and multiple GPIO contact pins 18c. The contact pins 18a, 18b, and 18c are respectively sized and positioned on predetermined positions of the rear surface of the card body 12 near the card fixing friction cut-out 14 of the card body 12. In particular, the GND contact pin 18a is configured to contact the GND contact pad 3a, the VCC contact pin 18b is configured to contact the VCC contact pad 3b, and the GPIO contact pins 18c is configured to contact the corresponding GPIO contact pads 3.

The battery 24 refers to a flat lithium-ion battery that can be laminated into the card body 12. The battery 24 includes an anode and a cathode. In a general sense, the battery 24 can refer to other types of battery.

The enrolment microcontroller unit 15 includes a microprocessor with a memory module. The microprocessor includes an electrical ground terminal that is electrically connected to the GND contact pin 18a and to the anode of the battery 24, and a power supply voltage terminal that is electrically connected to the VCC contact pin 18b and to the cathode of the battery 24. The microprocessor also includes few signal terminals, which are electrically connected to the GPIO contact pins 18c. The microprocessor further includes a low-power or power-down terminal, which is connected to a first end of a conductive wire 20 that is embedded within the card body 12. A second end of the wire 20 is connected to the electrical ground terminal of the microprocessor for configuring the microprocessor to a low-power mode or standby mode, wherein the microprocessor temporarily stops operating for energy saving. The wire 20 is placed such that a part of the wire 20 is located near a designated corner portion of the card body 12, wherein the designated corner portion is marked with a symbol or picture, such as a dotted line 29.

The display unit 21 includes a display screen. An external surface of the display screen is aligned with the front surface of the card body 12.

The NFC tag 27 includes an NFC microchip with an antenna, which is communicatively connected to the NFC microchip. The microchip includes a memory unit.

The QR code 30 refers to a two-dimensional barcode, which is either printed or provided with a label on the front surface of the card body 12.

The card body 12 of the enrolment card 10 is provided with an inlay. The inlay comprises a stack of plastic sheets and several components. The components include the enrolment microcontroller unit 15, the battery 24, at least one module lead frame and a plurality of electrical wires. The module lead frame refers to a metal structure for carrying electrical signal from one part of the lead frame to another part of the lead frame. Several holes are provided within the stack of the plastic sheets for receiving the enrolment microcontroller unit 15, the battery 24, and other components. The enrolment microcontroller unit 15 are connected to the battery 24 via the module lead frames and/or the electrical wires.

In use, a card owner or a user receives a biometric smart card 1 and a corresponding enrolment card 10 from, for example, a financial institution, such as a bank. The wire 20 is connected to the electrical ground terminal and to the low-power terminal of the enrolment microcontroller unit 15. The enrolment microcontroller unit 15 is placed in the low-power mode.

The user then cuts away the designated corner portion of the enrolment card 10. The cutting removes a part of the wire 20. This causes the low-power terminal of the enrolment microcontroller unit 15 to be disconnected from the electrical ground terminal. The enrolment microcontroller unit 15 is afterward changed from the low-power mode to a normal power mode.

The user later moves the biometric smart card 1 to engage with the enrolment card 10, wherein the rear surface of the enrolment card 10 is placed on top of the front surface of the biometric smart card 1 in a stack such that all edges of the enrolment card 10 are substantially aligned with all corresponding edges of the biometric smart card 1. The short edge 6 of the biometric smart card 1 is placed adjacent to the corresponding short edge 16 of the enrolment card 10. The fingerprint opening 13 of the enrolment card 10 is placed next to the fingerprint sensor 5 of the biometric smart card 1 and the contact pins 18a, 18c, and 18c face and touch the corresponding contact pads 3a, 3b, and 3c.

The user then places a finger onto the card fixing friction cut-out 14 of the enrolment card 10 and also presses the enrolment card 10 against the biometric smart card 1. The pressing of the finger onto the card fixing friction cut-out 14 generates frictional force, which acts to prevent the enrolment card 10 from moving with respect to the biometric smart card 1.

The pressing also causes the contact pins 18 to contact the corresponding contact pads 3 firmly. In particular, the GND contact pin 18a contacts the GND contact pad 3a while the VCC contact pin 18b contacts the VCC contact pad 3b to provide an electrically conductive path for allowing electrical power transmission from the battery 24 of the enrolment card 10 to the electronic components of the biometric smart card 1. The GPIO contact pins 18c also contact the GPIO contact pads 3c to provide an electrical signal path between the enrolment microcontroller unit 15 of the enrolment card 10 and the card microcontroller unit 8 of the biometric smart card 1.

The battery 24 then provides an electric supply voltage to the VCC contact pin 18b. The voltage is later transmitted to the VCC contact pad 3b of the biometric smart card 1 and to the card microcontroller unit 8 for powering the card microcontroller unit 8. The powered card microcontroller unit 8 later sends a ready signal to the GPIO contact pads 3c, to the GPIO contact pins 18c, and to the enrolment microcontroller unit 15. The enrolment microcontroller unit 15 afterward transmits an enrolment signal to the GPIO contact pins 18c, to the GPIO contact pads 3c, and to the card microcontroller unit 8 to commence the enrolment of the biometric smart card 1. The enrolment microcontroller unit 15 then directs the display unit 21 to display a text message for indicating to the user that the biometric smart card 1 is ready for enrolment.

The user then places the finger onto the fingerprint opening 13 and onto the fingerprint sensor 5 of the biometric smart card 1. The fingerprint sensor 5 afterward senses the finger and captures fingerprint data of the finger. The fingerprint sensor 5 later transmits the captured fingerprint data to the card microcontroller unit 8.

The card microcontroller unit 8 then generates a fingerprint biometric template according to the captured fingerprint data. The card microcontroller unit 8 afterwards stores the fingerprint biometric template.

The card microcontroller unit 8 then sends an enrolment completion signal to the enrolment microcontroller unit 15 of the enrolment card 10. The enrolment microcontroller unit 15 afterward receives the enrolment completion signal and then directs the display unit 21 to display a text message to indicate that the enrolment is completed. The user later removes the finger from the fingerprint opening 13.

The function of the NFC tag 27 can be used to link the biometric smart card 1 logically to a corresponding application of a mobile device, such as a mobile phone. Alternatively, the QR code 30 can serve the same functionality.

FIGS. 5 and 6 show another enrolment card 10A, which is a variant of the enrolment card 10. The enrolment card 10A is engaged with the biometric smart card 1.

The enrolment card 10A and the enrolment card 10 have similar parts, which are arranged similarly.

Differences between the enrolment card 10A and the enrolment card 10 only relates to the card body. The differences are described as below.

The enrolment card 10A has a rectangular card body 12A, which has a size that is similar to the size of the biometric smart card 1.

The card body 12A is similar to the card body 12 of the enrolment card 10. But the card body 12A does not have the card fixing friction cut-out 14 of the card body 12. The card body 12A further includes a shallow recess 32 and a contact pin pressing area 33. The recess 32 is located at a rear surface of the card body 12A while the contact pin pressing area 33 is located on a front surface of the card body 12A, which is opposite the recess 32. The recess 32 is provided with contact pins 18, which protrude from a major surface of the recess 32. The contact pin pressing area 33 can be marked with, for example, a rectangle.

In use, a user engages the enrolment card 10 with the biometric smart card 1 such that the contact pins 18 are placed next to the corresponding contact pads 3 with a gap between the contact pins 18 and the corresponding contact pads 3. The user later places a finger onto the contact pin pressing area 33 and presses the finger onto the enrolment card 10 towards the biometric smart card 1. The pressing causes the major surface of the recess 32 to move towards the front surface of the biometric smart card 1. The movement acts to reduce the gap until the contact pins 18 contact the corresponding contact pads 3 firmly.

The recess 32 allows the contact pins 18 not to touch the contact pads 3 even when the rear surface of the enrolment card 10 touches the front surface of the biometric smart card 1.

This can avoid friction between the contact pads 3 and the contact pins 18 when the biometric smart card 1 slides with respect to the enrolment card 10, thereby maintaining the contact integrity of the contact pads 3 and the contact pins 18.

FIGS. 7 and 8 show another enrolment card 10B, which is a variant of the enrolment card 10.

The enrolment card 10B and the enrolment card 10 have similar parts, which are arranged similarly.

Differences between the enrolment card 10B and the enrolment card 10 only relates to the card body. The differences are described as below.

The enrolment card 10B has a rectangular card body 12B, which has a size that is similar to the size of the biometric smart card 1.

The card body 12B includes a short edge 16 and a rectangular short edge portion 17, which is adjacent or next to the short edge 16.

The short edge portion 17 includes a first edge part 45, a first card reception opening 19, a second edge part 46, a second card reception opening 23, and a third edge part 47. The first edge part 45 is positioned next to the first card reception opening 19, which is positioned next to the second edge part 46. The second edge part 46 is positioned next to the second card reception opening 23, which is positioned next to the third edge part 47. An edge of the first edge part 45, an edge of the second edge part 46, and an edge of the third edge part 47 are aligned with the short edge 16.

The second edge part 46 is provided with multiple contact pins 18, which are located on a rear surface of the second edge part 46.

In one implementation, the card reception openings 19 and 23, are similar. Each card reception opening 19 and 23 includes three segments, namely, a base 35, a first curved side edge 39, and a second curved side edge 43. The base 35 is essentially parallel to the short edge 16. The base 35 has a first end and a second end, which is opposite the first end. The first curved side edge 39 has a first end that is connected to the first end of the base 35 and a second end that is connected to a part of the short edge 16. The second curved side edge 43 has a first end that is connected to the second end of the base 35 and a second end that is connected to another part of the short edge 16. The second curved side edge 43 is separated from the first curved side edge 39 by a gap.

As seen in FIG. 9, the card reception openings 19 and 23 are sized such that they act as guides for facilitating the engagement of the biometric smart card 1 with the enrolment card 10B so that the contact pads 3 can contact the corresponding contact pins 18 easily.

In detail, a user inserts a short edge portion near the short edge 6 of the biometric smart card 1 into the card reception openings 19 and 23 of the enrolment card 10B such that the short edge 6 of the biometric smart card 1 touches the bases 35 of the card reception openings 19 and 23 and such that long edges of the biometric smart card 1 and long edges of the enrolment card 10B are essentially aligned along straight lines. The biometric smart card 1 and the enrolment card 10B are also arranged such that the contact pins 18 face the contact pads 3.

In this arrangement, the short edge portion of the biometric smart card 1 is placed above the first edge part 45, above the third edge part 47, and below the second edge part 46 of the enrolment card 10B. Put differently, the short edge portion of the biometric smart card 1 is sandwiched between first edge part 45, the third edge part 47, and the second edge part 46. The second edge part 46, the first edge part 46, and the third edge part 47 together press against the biometric smart card 1 in opposing directions to cause the contact pins 18 to contact the contact pads 3 firmly and properly.

FIGS. 10 and 11 show a further enrolment card 10C, which is also a variant of the enrolment card 10.

The enrolment cards 10C and 10B are similar. Differences between the enrolment card 10C and the enrolment card 10B relating to the card body are described below.

The enrolment card 10C has a rectangular card body 12C. The card body 12C has a short edge 16, a long edge that is essentially perpendicular to the short edge 16, and a long edge portion 37 that is next to the long edge. The long edge portion 37 of the card body 12C and the short edge portion 17 of the card body 12B have similar parts, which are arranged similarly. Briefly, the long edge portion 37 of the card body 12C includes a first edge part 45, a first card reception opening 19, a second edge part 46, a second card reception opening 23, and a third edge part 47.

The card body 12C also includes two parallel alignment lines 51, which are marked on a front surface of the long edge portion 37. The alignment lines 51 are essentially perpendicular to the long edge. The alignment lines 51 are spaced apart from each other by a predetermined distance, which is essentially same as a length of the short edge 6 of the biometric smart card 1. The contact pins 18 are located between the alignment lines 51.

The alignment lines 51 and the card reception openings 19 and 23 are intended for facilitating the engagement of the biometric smart card 1 with the enrolment card 10C.

In use, as seen in FIG. 12, a user inserts the edge portion near the short edge 6 of the biometric smart card 1 into the card reception openings 19 and 23 of the enrolment card 10C such that the edge portion of the biometric smart card 1 is sandwiched between the first edge part 45, the third edge part 47, and the second edge part 46 of the card body 12C. The user then arranges the biometric card 1 until long edges of the biometric smart card 1 are essentially aligned with the alignment lines 51, wherein the alignment lines 51 are substantially covered by the biometric smart card 1 and are almost invisible to the user. This allows the contact pads 3 to contact the corresponding contact pins 18 easily.

Different implementations of the card reception openings 19 and 23 are possible. The curved side edge 39 of the respective card reception openings 19 and 23 can be a straight edge. Similarly, the curved side edge 43 can also be a straight edge. The number of the openings can also be one only.

Instead of the display unit 21, the display unit 21 can be replaced by a plurality of multi-colour light emitting diodes (LEDs). The colour LEDs are configured to display colour light, such as green, red, or yellow for indicating status of progress of the enrolment of the biometric smart card. For examples, LEDs can emit yellow light to indicate the enrolment being progressing, emit red light to indicate the enrolment being not successful, or emit green light to indicate the enrolment being complete. The colour LEDs can also be configured to emit different colour patterns to indicate the status of progress of the enrolment of the biometric smart card, such as first flashing or blinking green light for indicating commencement of the enrolment, or second blinking green light for indicating the enrolment being complete.

In one embodiment, the enrolment card 10 is configured to communicate wirelessly with a biometric smart card that is provided with an NFC device using NFC communication protocol. The NFC device can include an antenna that is electrically or communicatively connected to the microcontroller unit 8 of the biometric smart card. The enrolment microcontroller unit 15 of the enrolment card 10 is configured to communicatively connect with an antenna, such as a loop antenna according to ISO/IEC 14443-1. The antenna acts to transfer power or energy to the biometric smart card, as well as to enable data transmission between the biometric smart card and the enrolment card 10.

The enrolment card 10 provides several benefits.

The enrolment card 10 is provided in a standard credit card size, which can be easily distributed to users. The users can perform self-enrolment of biometric smart card 1 remotely anytime and anywhere using the enrolment card 10, thereby eliminating the inconveniences of visiting banks or premises that are authorized by the banks for enrolment of the biometric smart card 1.

Since the enrolment card 10 has a shape and a size of a credit card that is similar to the biometric smart card 1, the enrolment card 10 and the biometric smart card 1 can be produced using a same machine in a similar manner by a manufacturer. This allows the enrolment card to be produced at lower cost compared to other biometric enrolment devices, which often have form factors or physical specifications that are different from the credit card.

Furthermore, the enrolment card 10, together with the biometric smart card 1, can be conveniently delivered to a user using, for example, a mailing letter.

Moreover, the enrolment card 10 includes card engagement features, such as card reception openings 19 and 23, for quick and easy alignment between the enrolment card 10 and the biometric smart card 1 such that the contact pins 18 of the enrolment card 10 contact the contact pads 3 of the biometric smart card 1, thereby enabling the user to perform self-enrolment of the biometric smart card 1 easily and efficiently.

The embodiments can also be described with the following lists of features or elements being organized into an item list. The respective combinations of features, which are disclosed in the item list, are regarded as independent subject matter, respectively, that can also be combined with other features of the application.

1. A biometric enrolment setup comprising
    a biometric card and
    an enrolment card for transferring fingerprint biometric information of a user to the biometric card,
   wherein the biometric card comprises
    a plurality of contact pads,
    a fingerprint sensor,
    a first microcontroller unit being electrically connected to the contact pads and to the fingerprint sensor, and
    a first card body, wherein the fingerprint sensor and the first microcontroller unit are embedded in the first card body,
   the enrolment card comprises
    a battery for providing electrical power,
    a second microcontroller unit being electrically connected to the battery,
    a plurality of contact pins being electrically connected to the battery and to the second microcontroller unit, and
    a second card body with a card engagement element, the second card body being sized to correspond to the first card body,
    wherein the battery and the second microcontroller unit are embedded in the second card body such that the second card body encloses the battery and the second microcontroller unit,
   the biometric enrolment setup provides an enrolment mode,
   in the enrolment mode,
    the card engagement element of the second card body engages with the first card body for allowing the contact pins of the enrolment card to contact the corresponding contact pads of the biometric card,
    the battery provides the electrical power to the first microcontroller unit,
    the fingerprint sensor obtains fingerprint biometric information of the user, and
    the first microcontroller unit generates a reference fingerprint biometric template according to the fingerprint biometric information and stores the reference fingerprint biometric template.
2. The biometric enrolment setup according to item 1, wherein the second card body of the enrolment card comprises an inlay, the inlay comprises a stack of plastic sheets and at least one hole provided within the stack of plastic sheets for receiving the battery and/or the second microcontroller unit.
3. The biometric enrolment setup according to item 1 or 2, wherein the card engagement element comprises a fingerprint opening.
4. The biometric enrolment setup according to item 3, wherein the card engagement element further comprises a card fixing friction opening for preventing the contact pins from moving with respect to the corresponding contact pads.

5. The biometric enrolment setup according to item 1, wherein the second card body is provided with a rectangular shape.
6. The biometric enrolment setup according to item 5, wherein the card engagement element comprises at least one card reception opening being provided on an edge portion of the second card body.
7. The biometric enrolment setup according to item 6, wherein
the edge portion is provided near a short edge of the second card body.
8. The biometric enrolment setup according to item 6, wherein
the edge portion is provided near a long edge of the second card body.
9. The biometric enrolment setup according to item 8, wherein
the card engagement element further comprises at least one alignment line for positioning the first card body with respect to the second card body.
10. The biometric enrolment setup according to one of items 1 to 9, wherein the enrolment card further comprises a low power means for configuring the second microcontroller unit into a low power mode.
11. The biometric enrolment setup according to item 10, wherein
the low power means comprises a wire that connects a low power terminal of the second microcontroller unit to an electrical ground.
12. An enrolment card for a biometric card with a first card body, the enrolment card comprising
a battery for providing electrical power,
a microcontroller unit being electrically connected to the battery,
a plurality of contact pins being electrically connected to the battery and to the microcontroller unit, and
a second card body with a card engagement element, the second card body being sized to correspond to the first card body,
wherein the battery and the microcontroller unit are embedded in the second card body such that the second card body encloses the battery and the microcontroller unit,
the enrolment card provides an enrolment mode, in the enrolment mode,
the card engagement element engages with the first card body for allowing the contact pins to contact corresponding contact pads of the biometric card,
the battery provides the electrical power to the biometric card.
13. The enrolment card according to item 12, wherein the second card body comprises an inlay, the inlay comprises a stack of plastic sheets and at least one hole provided within the stack of plastic sheets for receiving the battery and/or the microcontroller unit.
14. The enrolment card according to item 12 or 13, wherein the card engagement element comprises a fingerprint opening.
15. The enrolment card according to item 14, wherein the card engagement element further comprises a card fixing friction opening for preventing the contact pins from moving with respect to the corresponding contact pads.
16. The enrolment card according to item 12, wherein the second card body is provided with a rectangular shape.
17. The enrolment card according to item 16, wherein the card engagement element comprises at least one card reception opening being provided on an edge portion of the second card body.
18. The enrolment card according to item 17 wherein the edge portion is provided near a short edge of the second card body.
19. The enrolment card according to item 17, wherein the edge portion is provided near a long edge of the second card body.
20. The enrolment card according to item 19, wherein the card engagement element further comprises at least one alignment line for positioning the first card body with respect to the second card body.
21. The enrolment card according to one of items 12 to 20, further comprising
a low power means for configuring the microcontroller unit into a low power mode.
22. The enrolment card according to item 21, wherein the low power means comprises a wire that connects a low power terminal of the microcontroller unit to an electrical ground.
23. A biometric card comprising
a plurality of contact pads,
a fingerprint sensor,
a microcontroller unit being electrically connected to the contact pads and to the fingerprint sensor, and
a card body, wherein the fingerprint sensor and the microcontroller unit are embedded in the card body,
wherein the contact pads are configured to receive electrical power from a battery of an enrolment card, the fingerprint sensor is configured to obtain fingerprint biometric information of a user, and the microcontroller unit is configured to generate a reference fingerprint biometric template according to the obtained fingerprint biometric information and to store the reference fingerprint biometric template.
24. A method for enrolment of a biometric card using an enrolment card comprising
engaging a card engagement element of the enrolment card with the biometric card for allowing contact pins of the enrolment card to contact corresponding contact pads of the biometric card,
providing electrical power by a battery of the enrolment card to a microcontroller unit of the biometric card,
obtaining fingerprint biometric information of a user by a fingerprint sensor of the biometric card,
generating a reference fingerprint biometric template according to the obtained fingerprint biometric information by the microcontroller unit of the biometric card, and
storing the generated reference fingerprint biometric template in the microcontroller unit of the biometric card.
25. A biometric enrolment setup comprising
a biometric card and
an enrolment card for transferring fingerprint biometric information of a user to the biometric card,
wherein the biometric card comprises
a first antenna,
a fingerprint sensor,
a first microcontroller unit being electrically connected to the first antenna and to the fingerprint sensor, and
a first card body,
wherein the fingerprint sensor, the first microcontroller unit, and the first antenna are embedded in the first card body, the enrolment card comprises
- a battery for providing electrical power,
- a second microcontroller unit being electrically connected to the battery,
- a second antenna being electrically connected to the second microcontroller unit, and
- a second card body,
- wherein the battery, the second microcontroller unit, and the second antenna are embedded in the second card body such that the second card body encloses the battery, the second microcontroller unit, and the second antenna, the biometric enrolment setup provides an enrolment mode, in the enrolment mode,
- the second microcontroller unit receives the electrical power from the battery,
- the second microcontroller unit powers the second antenna for communicatively connecting the second antenna with the first antenna,
- the second antenna transmits the electrical power to the first microcontroller unit,
- the fingerprint sensor obtains fingerprint biometric information of a user, and
- the first microcontroller unit generates a reference fingerprint biometric template according to the obtained fingerprint biometric information and stores the reference fingerprint biometric template.

26. The biometric enrolment setup according to item 25, wherein the second card body comprises an inlay, the inlay comprises a stack of plastic sheets and at least one hole provided within the stack of plastic sheets for receiving the battery and/or the second microcontroller unit.

27. The biometric enrolment setup according to item 25 or 26, wherein the enrolment card further comprises
- a low power means for configuring the second microcontroller unit into a low power mode.

28. The biometric enrolment setup according to item 27, wherein
- the low power means comprises a wire that connects a low power terminal of the second microcontroller unit to an electrical ground.

29. An enrolment card for a biometric card with a first antenna, the enrolment card comprising
- a battery for providing electrical power,
- a microcontroller unit being electrically connected to the battery,
- a second antenna being electrically connected to the microcontroller unit, and
- a card body,
- wherein the battery, the microcontroller unit, and the second antenna are embedded in the card body such that the card body encloses the battery, the microcontroller unit, and the second antenna, the enrolment card provides an enrolment mode, in the enrolment mode,
- the microcontroller unit receives the electrical power from the battery,
- the microcontroller unit powers the second antenna for communicatively connecting with the first antenna, and
- the second antenna transmits the electrical power to a microcontroller unit of the biometric card.

30. The biometric enrolment setup according to item 29, wherein the second card body comprises an inlay, the inlay comprises a stack of plastic sheets and at least one hole provided within the stack of plastic sheets for receiving the battery and/or the microcontroller unit.

31. The enrolment card according to item 29 or 30 further comprising
- a low power means for configuring the microcontroller unit into a low power mode.

32. The enrolment card according to item 31, wherein the low power means comprises a wire that connects a low power terminal of the microcontroller unit to an electrical ground.

33. A biometric card comprising
- an antenna,
- a fingerprint sensor,
- a microcontroller unit being electrically connected to the antenna and to the fingerprint sensor, and
- a card body, wherein the fingerprint sensor, the microcontroller unit, and the antenna are embedded in the card body such that the card body encloses the fingerprint sensor, the microcontroller unit, and the antenna, wherein the antenna is configured to receive electrical power from a battery of an enrolment card, the fingerprint sensor is configured to obtain fingerprint biometric information of a user, and the microcontroller unit is configured to generate a reference fingerprint biometric template according to the obtained fingerprint biometric information and to store the reference fingerprint biometric template.

Although the above description contains much specificity, this should not be construed as limiting the scope of the embodiments but merely providing illustration of the foreseeable embodiments. The above stated advantages of the embodiments should not be construed especially as limiting the scope of the embodiments but merely to explain possible achievements if the described embodiments are put into practice. Thus, the scope of the embodiments should be determined by the claims and their equivalents, rather than by the examples given.

REFERENCE NUMBERS 1 biometric smart card
2 card body
3 contact pads
3a GND contact pad
3b VCC contact pad
3c GPIO contact pad
4 contact pad module
5 fingerprint sensor
6 short edge
8 card microcontroller unit
10 enrolment card
10A enrolment card
10B enrolment card
10C enrolment card
12 card body
12A card body
12B card body
12C card body
13 fingerprint opening
14 card fixing friction cut-out
15 enrolment microcontroller unit
16 short edge
17 short edge portion
18 contact pins
18a GND contact pin
18b VCC contact pin
18c GPIO contact pins
19 card reception opening
20 wire
21 display unit 23 card reception opening
24 battery
27 NFC tag
28 contact pin module
29 dotted line
30 QR code
32 recess
33 contact pin pressing area
35 base
37 long edge portion
39 first side edge
43 second side edge
45 first edge part
46 second edge part
47 third edge part
51 alignment line

The invention claimed is:

1. A biometric enrolment setup comprising
 a biometric card and
 an enrolment card for transferring fingerprint biometric information of a user to the biometric card,
wherein the biometric card comprises
 a plurality of contact pads,
 a fingerprint sensor,
 a first microcontroller unit being electrically connected to the contact pads and to the fingerprint sensor, and
 a first card body, wherein the fingerprint sensor and the first microcontroller unit are embedded in the first card body,
the enrolment card comprises
 a battery for providing electrical power,
 a second microcontroller unit being electrically connected to the battery,
 a plurality of contact pins being electrically connected to the battery and to the second microcontroller unit, and
 a second card body with a card engagement element, the second card body being sized to correspond to the first card body,
 wherein the battery and the second microcontroller unit are embedded in the second card body such that the second card body encloses the battery and the second microcontroller unit,
the biometric enrolment setup provides an enrolment mode, in the enrolment mode,
 the card engagement element of the second card body engages with the first card body for allowing the contact pins of the enrolment card to contact the corresponding contact pads of the biometric card,
 the battery provides the electrical power to the first microcontroller unit,
 the fingerprint sensor obtains fingerprint biometric information of the user, and
 the first microcontroller unit generates a reference fingerprint biometric template according to the fingerprint biometric information and stores the reference fingerprint biometric template.

2. The biometric enrolment setup according to claim 1, wherein the second card body of the enrolment card comprises an inlay, the inlay comprises a stack of plastic sheets and at least one hole provided within the stack of plastic sheets for receiving the battery and/or the second microcontroller unit.

3. The biometric enrolment setup according to claim 1, wherein the card engagement element comprises a fingerprint opening.

4. The biometric enrolment setup according to claim 3, wherein the card engagement element further comprises a card fixing friction opening for preventing the contact pins from moving with respect to the corresponding contact pads.

5. The biometric enrolment setup according to claim 1, wherein the second card body is provided with a rectangular shape.

6. The biometric enrolment setup according to claim 5, wherein the card engagement element comprises at least one card reception opening being provided on an edge portion of the second card body.

7. The biometric enrolment setup according to claim 6, wherein
 the edge portion is provided near a short edge of the second card body.

8. The biometric enrolment setup according to claim 6, wherein
 the edge portion is provided near a long edge of the second card body.

9. The biometric enrolment setup according to claim 8, wherein
 the card engagement element further comprises at least one alignment line for positioning the first card body with respect to the second card body.

10. The biometric enrolment setup according to claim 1, wherein the enrolment card further comprises
 a low power means for configuring the second microcontroller unit into a low power mode.

11. The biometric enrolment setup according to claim 10, wherein
 the low power means comprises a wire that connects a low power terminal of the second microcontroller unit to an electrical ground.

12. An enrolment card for a biometric card with a first card body, the enrolment card comprising
 a battery for providing electrical power,
 a microcontroller unit being electrically connected to the battery,
 a plurality of contact pins being electrically connected to the battery and to the microcontroller unit, and
 a second card body with a card engagement element, the second card body being sized to correspond to the first card body,
 wherein the battery and the microcontroller unit are embedded in the second card body such that the second card body encloses the battery and the microcontroller unit,
the enrolment card provides an enrolment mode, in the enrolment mode,
 the card engagement element engages with the first card body for allowing the contact pins to contact corresponding contact pads of the biometric card,
 the battery provides the electrical power to the biometric card.

13. The enrolment card according to claim 12, wherein the second card body comprises an inlay, the inlay comprises a stack of plastic sheets and at least one hole provided within the stack of plastic sheets for receiving the battery and/or the microcontroller unit.

14. The enrolment card according to claim 12, wherein the card engagement element comprises a fingerprint opening.

15. The enrolment card according to claim 14, wherein the card engagement element further comprises a card fixing friction opening for preventing the contact pins from moving with respect to the corresponding contact pads.

16. The enrolment card according to claim 12, wherein the second card body is provided with a rectangular shape.

17. The enrolment card according to claim 16, wherein the card engagement element comprises at least one card reception opening being provided on an edge portion of the second card body.

18. The enrolment card according to claim 17 wherein the edge portion is provided near a short edge of the second card body.

19. The enrolment card according to claim 17, wherein the edge portion is provided near a long edge of the second card body.

20. The enrolment card according to claim 19, wherein the card engagement element further comprises at least one alignment line for positioning the first card body with respect to the second card body.

21. The enrolment card according to claim 12 further comprising
a low power means for configuring the microcontroller unit into a low power mode.

22. The enrolment card according to claim 21, wherein the low power means comprises a wire that connects a low power terminal of the microcontroller unit to an electrical ground.

23. A biometric card comprising
a plurality of contact pads,
a fingerprint sensor,
a microcontroller unit being electrically connected to the contact pads and to the fingerprint sensor, and
a card body, wherein the fingerprint sensor and the microcontroller unit are embedded in the card body,
wherein the contact pads are configured to receive electrical power from a battery of an enrolment card, the fingerprint sensor is configured to obtain fingerprint biometric information of a user, and the microcontroller unit is configured to generate a reference fingerprint biometric template according to the obtained fingerprint biometric information and to store the reference fingerprint biometric template.

24. A method for enrolment of a biometric card using an enrolment card comprising
engaging a card engagement element of the enrolment card with the biometric card for allowing contact pins of the enrolment card to contact corresponding contact pads of the biometric card,
providing electrical power by a battery of the enrolment card to a microcontroller unit of the biometric card,
obtaining fingerprint biometric information of a user by a fingerprint sensor of the biometric card,
generating a reference fingerprint biometric template according to the obtained fingerprint biometric information by the microcontroller unit of the biometric card, and
storing the generated reference fingerprint biometric template in the microcontroller unit of the biometric card.

25. A biometric enrolment setup comprising
a biometric card and
an enrolment card for transferring fingerprint biometric information of a user to the biometric card,
wherein the biometric card comprises
a first antenna,
a fingerprint sensor,
a first microcontroller unit being electrically connected to the first antenna and to the fingerprint sensor, and
a first card body,
wherein the fingerprint sensor, the first microcontroller unit, and the first antenna are embedded in the first card body,
the enrolment card comprises
a battery for providing electrical power,
a second microcontroller unit being electrically connected to the battery,
a second antenna being electrically connected to the second microcontroller unit, and
a second card body,
wherein the battery, the second microcontroller unit, and the second antenna are embedded in the second card body such that the second card body encloses the battery, the second microcontroller unit, and the second antenna,
the biometric enrolment setup provides an enrolment mode, in the enrolment mode,
the second microcontroller unit receives the electrical power from the battery,
the second microcontroller unit powers the second antenna for communicatively connecting the second antenna with the first antenna,
the second antenna transmits the electrical power to the first microcontroller unit,
the fingerprint sensor obtains fingerprint biometric information of a user, and
the first microcontroller unit generates a reference fingerprint biometric template according to the obtained fingerprint biometric information and stores the reference fingerprint biometric template.

26. The biometric enrolment setup according to claim 25, wherein the second card body comprises an inlay, the inlay comprises a stack of plastic sheets and at least one hole provided within the stack of plastic sheets for receiving the battery and/or the second microcontroller unit.

27. The biometric enrolment setup according to claim 25, wherein the enrolment card further comprises
a low power means for configuring the second microcontroller unit into a low power mode.

28. The biometric enrolment setup according to claim 27, wherein
the low power means comprises a wire that connects a low power terminal of the second microcontroller unit to an electrical ground.

29. An enrolment card for a biometric card with a first antenna, the enrolment card comprising
a battery for providing electrical power,
a microcontroller unit being electrically connected to the battery,
a second antenna being electrically connected to the microcontroller unit, and
a card body,
wherein the battery, the microcontroller unit, and the second antenna are embedded in the card body such that the card body encloses the battery, the microcontroller unit, and the second antenna,
the enrolment card provides an enrolment mode, in the enrolment mode,
the microcontroller unit receives the electrical power from the battery,
the microcontroller unit powers the second antenna for communicatively connecting with the first antenna, and
the second antenna transmits the electrical power to a microcontroller unit of the biometric card.

30. The biometric enrolment setup according to claim 29, wherein the second card body comprises an inlay, the inlay comprises a stack of plastic sheets and at least one hole provided within the stack of plastic sheets for receiving the battery and/or the microcontroller unit.

31. The enrolment card according to claim 29 further comprising
    a low power means for configuring the microcontroller unit into a low power mode.
32. The enrolment card according to claim 31, wherein the low power means comprises a wire that connects a low power terminal of the microcontroller unit to an electrical ground.
33. A biometric card comprising
    an antenna,
    a fingerprint sensor,
    a microcontroller unit being electrically connected to the antenna and to the fingerprint sensor, and
    a card body, wherein the fingerprint sensor, the microcontroller unit, and the antenna are embedded in the card body such that the card body encloses the fingerprint sensor, the microcontroller unit, and the antenna, wherein the antenna is configured to receive electrical power from a battery of an enrolment card, the fingerprint sensor is configured to obtain fingerprint biometric information of a user, and the microcontroller unit is configured to generate a reference fingerprint biometric template according to the obtained fingerprint biometric information and to store the reference fingerprint biometric template.

* * * * *